Feb. 9, 1926.
W. H. GROTE
COUPLING DEVICE
Filed April 2, 1925
1,572,355
2 Sheets-Sheet 1
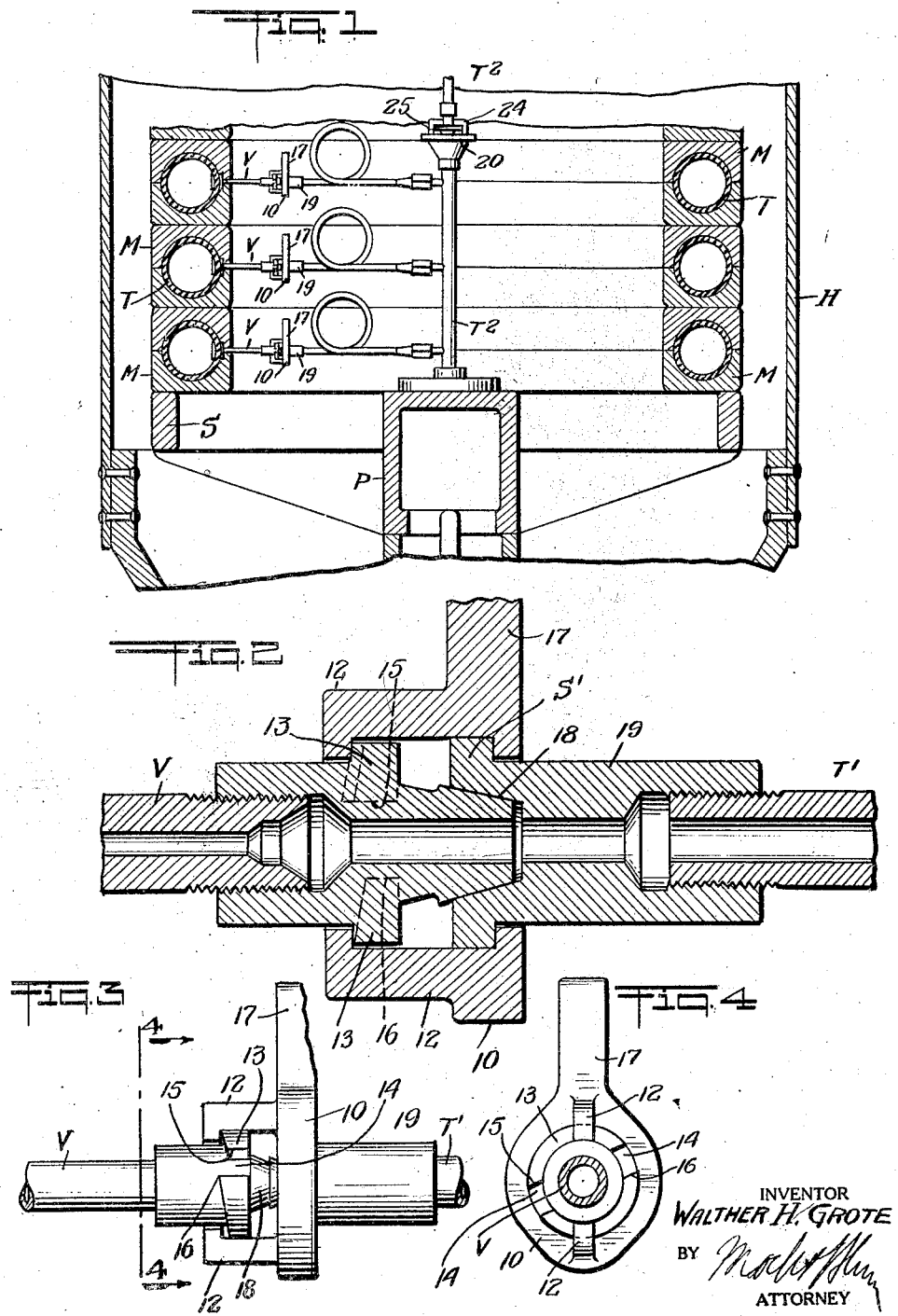
INVENTOR
WALTHER H. GROTE
BY
ATTORNEY

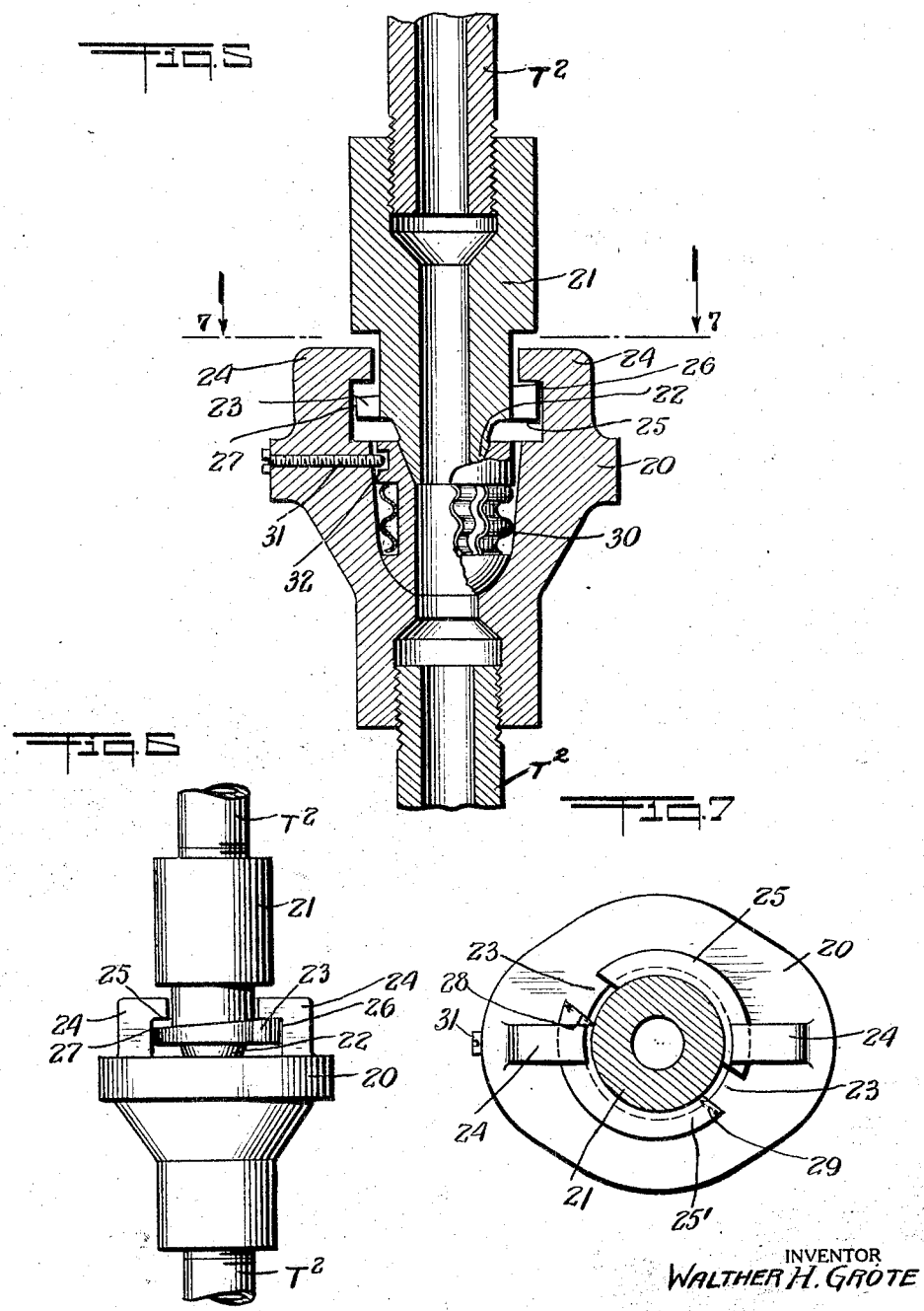

Patented Feb. 9, 1926.

1,572,355

UNITED STATES PATENT OFFICE.

WALTHER H. GROTE, OF BROOKLYN, NEW YORK, ASSIGNOR TO C. KENYON COMPANY, INC., OF BROOKLYN, NEW YORK, A CORPORATION OF NEW YORK.

COUPLING DEVICE.

Application filed April 2, 1925. Serial No. 20,043.

*To all whom it may concern:*

Be it known that I, WALTHER H. GROTE, a citizen of the United States, residing at Brooklyn, in the county of Kings and State of New York, have invented certain new and useful Improvements in Coupling Devices, of which the following is a specification.

My invention relates to a new and improved coupling device for tire vulcanizers and for other purposes.

One of the objects of my invention is to devise a vulcanizing device which will be especially adaptable for connecting together the vertical sections of the vertical piping ordinarily employed in vulcanizers for rubber tires.

Another object of my invention is to devise a coupling device which will also be especially adaptable for connecting the air bags used in vulcanizing the tire to the said vertical piping, in order to allow air under pressure to be forced into and to be maintained in the said air bags while the tires are being vulcanized.

Another object of my invention is to provide a coupling device which will be especially adaptable for said purpose and which will obviate the need of threading on the pipe sections or parts to be joined.

Another object of my invention is to devise a coupling which will be especially adaptable for said purpose and which will hold the pipe sections or parts securely and firmly together so that the parts cannot be uncoupled by the jarring or movement incident to the operation of the vulcanizer.

Another object of my invention is to provide a coupling device especially adaptable for said purpose which will be self-locking so that it will require positive manipulation to uncouple the parts.

Other objects of my invention will be set forth in the following description and drawings which illustrate a preferred embodiment thereof, it being understood that the foregoing general statement of the objects of my invention is merely intended to generally illustrate the same, and not to limit it.

Fig. 1 is a section which is partially diagrammatic and which generally illustrates a vulcanizer in which my coupling device is utilized.

Fig. 2 is a detail central section showing the connection between a vertical air pipe section and a bag valve.

Fig. 3 is a detail side elevation showing the parts illustrated in Fig. 2.

Fig. 4 is a detail top elevation showing the parts illustrated in Figs. 2 and 3.

Fig. 5 is a detail sectional view showing the coupling device as applied to the vertical piping.

Fig. 6 is a detail elevation of some of the parts illustrated in Fig. 5.

Fig. 7 is a detail top view partially in section of the parts illustrated in Fig. 6.

The ordinary vulcanizer H consists of a tubular steel structure which is mounted below the level of the floor of the factory so that the top of the vulcanizer is substantially level with the top of the floor. This vulcanizer has a movable support or table S mounted upon a vertical piston P which is raised and lowered by hydraulic means. It is customary to first raise the table or support S until it is a little below the floor level and to then place thereon three (3) tire molds M, each of which contains a tire to be vulcanized, and to then place the first vertical pipe section $T^2$ in position. Each said tire has an air bag T therein which is generally similar to the inner tube of an ordinary tire, although of much heavier construction. Each said bag has a valve V projecting therefrom and this valve can be of any ordinary and well known construction.

The drawings do not show the tires located in the molds M, as this representation has been omitted for the sake of clearness.

It is necessary for the workmen to rapidly couple these bag valves to three (3) horizontal pipes which are connected to the first vertical pipe section. The support S is then lowered, three more molds are put into position, and then a second vertical pipe section is coupled to the first, and the air bags of the tires in these molds are connected to the second pipe section, and this operation is continued until the vulcanizer has received the full number of molds.

In a well equipped plant these molds are delivered to the vulcanizer from conveyers and it is therefore necessary for the workmen to perform the coupling operations very rapidly or else the motion of the conveyers must be stopped and accidents can and frequently do occur, unless the greatest care is exercised, because while a workman is bending over the pit to couple the pipes together, he can be struck by the heavy molds if the conveyer is not stopped at the proper moment.

In addition, the fact that it is necessary to couple the parts together very rapidly and while the workmen are bending over the vulcanizer, which is kept very hot, often causes the work to be done carelessly so that the air line is not properly closed at all parts thereof, which means that all the tires in the batch which is being vulcanized are ruined.

In couplings of the type heretofore known, the movement of the table or support upon which the molds are mounted causes a certain amount of jarring, which sometimes results in the loosening of the coupling parts, so that the air line is open during the vulcanizing process.

According to my invention, the above defects are either obviated or very largely minimized.

Each tire bag T, which in actual use is inside a tire to be vulcanized, is equipped with the ordinary valve V which may be of any well known type.

Each vertical pipe section T² is provided with three openings and a coupling pipe T' is connected to each of these openings.

As shown in Fig. 2, a nipple 19 whose inner end is internally threaded, is mounted upon the externally threaded end of a pipe T'. The nipple 19 is provided with two separated arcuate segments or shoulders S' divided by intermediate spaces, so that the construction of the shoulders S' is similar to the construction of the shoulders 13 of the inner nipple 18, which will be later more fully described. A coupling member 10 provided with a handle 17 is loosely mounted upon the outer nipple 19. The coupling member 10 is provided with shoulders 12 which are adapted to pass between the shoulders S', by means of the recesses or depressions similar to the depressions 14 between the shoulders 13, so that the coupling member 10 can be moved into the position shown in Fig. 2 and be freely revolved while in said position. The shoulders S' prevent the coupling member 10 moving beyond the outer end of the nipple 19. The shoulders S' are not eccentric with respect to the longitudinal axis of nipple 19.

Each valve stem V has an inner nipple 18 connected to the outer end thereof. Said nipple 18 has a tapered head which fits into the outer tapered portion of the outer nipple 19. The inner nipple 18 is provided with two shoulders 13 which are eccentric with respect to the longitudinal axis of the nipple 18. The thick or wide end of one of the shoulders 13 is adjacent the thin or narrow end of the other shoulder 13. The shoulders 12 of the coupling member 10 can pass through the spaces 14 intermediate the shoulders 13 so that the parts can be assembled in the position shown in Fig. 2. By then turning the handle 17, each shoulder 12 rides upon one of the tapered shoulders or segments 13 so that the inner nipple 18 is forced very firmly into the outer nipple 19 and their correspondingly tapered surfaces are held together in an air-tight manner without the need of using any washers or the like. The handle 17 is made so heavy that the weight thereof tends to move the coupling member 10 into the locking position and to hold it firmly in the locking position. As shown in Figs. 2 and 3, each shoulder 13 has a narrow or thin end 15 and a wide or thick end 16. The taper or pitch of shoulders 13 is so small that the parts are self-locking, but the weighted handle 17 prevents any separation of the parts because of the jarring to which they are subjected during the use of the device. The outer nipple 19 and the inner nipple 18 are locked together in the final locking position while the shoulders 12 are in contact with the eccentric slopes of shoulders 13.

In the position shown in Fig. 3, the parts are shown in the position occupied by the coupling member 10 as it is revolved to lock the members 18 and 19 together. Hence, in order to couple each tire bag T to one of the coupling pipes T', it is merely necessary to move the parts into the position shown in Fig. 3 and then it is possible to manipulate the handle 17 if this is necessary, in order to lock the parts firmly together. As before stated, the overbalancing action of the handle 17 will be ordinarily sufficient to lock the parts firmly together.

In order to couple two vertical pipe sections T², a similar device is employed. As shown in Fig. 5, for example, the upper end of each pipe section T is provided with a nipple 20 having a ball seat. An inner member 32 having a tapered bore is adapted to be seated within the nipple 20 so that the said inner member 32 which may be termed the "seating member" can have a slightly lateral movement. The seating member 32 is loosely connected to the nipple 20 by means of a screw 31 whose ends project into a recess in the seating member 32. The screw is not necessary but its use is preferred so as to prevent the seating member 32 from falling out of the nipple 20. As can be seen in Fig. 5, this recess has a diameter which is about $\frac{1}{32}$nd of an inch greater than the diameter of the screw 31 in order to permit the before mentioned slightly lateral movement of the seating member 32. The seating member 32 is provided with a longitudinal recess in which a corrugated and resilient metal plate 30 is mounted. This metal plate 30 has no function when the seating member 32 is exactly central with respect to the longitudinal axis of the nipple 20, but if the seating member 32 is moved laterally, then the corrugated plate 30 contacts with the adjacent inner wall of the recess of the nipple 20 so as to resist further displacement of the seating member. The nipple 20 is provided with shoulders 24 which are similar in construction to the shoulders 12 before described. The lower end of each pipe section T² (except for the lowest section which rests directly upon the top of the piston P as shown in Fig. 1) is provided with a nipple 21 having a tapered end. Each said inner member 21 is provided with shoulders 25 and 25′ and each said shoulder is tapered longitudinally, and shoulder 25′ is also tapered laterally. That is, what may be termed the radial dimension of shoulder 25′ is greater at one end than at the other end, so that said shoulder 25′ has a relatively narrow end 28 and a relatively wide end 29 in a direction perpendicular to the central axis of the nipple 21. The shoulders 25 and 25′ are separated by spaces 23 similar to the spaces 14 before mentioned. As shown in Fig. 5, each said shoulder 25 and 25′ is provided with a relatively narrow end 27 and a relatively wide end 26, considering the dimension of each said shoulder in a direction parallel to the common longitudinal axis of the nipples 20 and 21. The dimension of each said shoulder in a direction parallel to said axis may be termed the longitudinal dimension thereof.

The shoulders 24 of the nipple 20 can pass through the recesses or spaces 23 intermediate the shoulders 25 and 25′.

Hence, each pipe section T² above the lowest pipe section T² has a bottom nipple 21 which can be moved into the position shown in Fig. 5 and then turned about its longitudinal axis. The longitudinal eccentricity of the shoulders 25 and 25′ cause the parts to be firmly locked together. In addition, the lateral or radial eccentricity of the shoulder 25′ causes the parts to be retained in the locked position in the following manner.

The lateral dimension of the shoulder 25′, which has a double eccentricity is greatest at the end where its longitudinal dimension is the smallest. Hence, when the shoulders 25 and 25′ are below the shoulders 24 and the nipple 21 is then turned, the radially thickest portion of said shoulder 25′ first contacts with the vertical walls of the nipple 30 immediately below the shoulders 24. Hence, as the radially thickest portion of said shoulder 25′ passes underneath the shoulders 24 and contacts with the adjacent vertical wall of the nipple 20, the seating member 32 is first given a slight lateral movement and then when the turning of the nipple 21 in order to lock the parts together has been completed, so that the radially thin portions of said shoulder 25′ is now below the shoulders 24, the seating member 32 is free to assume a central position, but any reverse turning movement of the nipple 21 requires positive force in order to force the radially thick portion of said shoulder 25′ back to its original position, and against the resistance of the corrugated plate 30. Hence, the coupling parts are positively held both vertically and horizontally. Furthermore, as each vertical coupling between two consecutive pipe sections T² is tightened, this tightens each and every lower coupling previously made so that if by reason of any jarring or the like any of the lower vertical couplings become unloosened, it is not necessary to do the work all over again, and it is impossible to complete the vulcanizing without noticing whether or not the lower couplings have become loose.

In order to uncouple either the horizontal or vertical coupling before described, positive force is necessary and the tightness of the coupling is not affected by jarring or the like. It is not necessary to fit together threaded parts, which is often done carelessly and improperly, and the use of my improved coupling requires a minimum amount of labor while the workmen are bending over the hot vulcanizer.

I have described a preferred embodiment of my invention, but it is clear that numerous changes and omissions could be made without departing from its spirit.

I claim:—

1. In a coupling device, the subcombination of an outer nipple, a seating member located within said outer nipple, means adapted to movably connect said seating member to said nipple so as to permit a limited movement of said seating member, resilient means connected to said seating member and adapted to restrain the movement thereof from a predetermined position, an inner nipple adapted to enter said seating member, said seating member and said inner nipple having corresponding surfaces, said outer nipple having a projecting portion adapted to engage said inner nipple with respect to said seating member forced inwardly into said seating member when said inner nipple is turned.

2. In a coupling, the subcombination of a pipe section, a nipple connected thereto, a seating member located within said nipple, resilient means located laterally with respect to said seating member and adapted to restrain the movement of said seating member from a predetermined position in said nipple, and holding means adapted to connect said seating member to said nipple while permitting a limited movement of said seating member.

3. In a coupling, a pipe section having an outer nipple connected thereto, a second pipe section having an inner nipple connected thereto, said outer nipple having inwardly projecting shoulders at the end thereof, said outer nipple also having a seating member located therein, said inner nipple being adapted to enter said seating member, said inner nipple and said seating member having corresponding surfaces, means adapted to restrain the movement of said seating member from a predetermined position, connecting means adapted to connect said seating member to said outer nipple while permitting a limited free movement thereof, said inner nipple having spaced shoulders, the shoulders of said outer nipple being adapted to pass through the spaces between the shoulders of said inner nipple and to then engage the shoulders of said inner nipple, both shoulders of said inner nipple having a longitudinal eccentricity and one of said shoulders also having a radial eccentricity and being radially thickest at the end thereof which is adapted to first contact with the corresponding part of said outer nipple.

In testimony whereof I affix my signature.

WALTHER H. GROTE.